W. W. Ayres,
Water Filter,
N° 18,031. Patented Aug. 25, 1857.

UNITED STATES PATENT OFFICE.

WM. W. AYRES, OF WORCESTER, MASSACHUSETTS.

FILTER.

Specification of Letters Patent No. 18,031, dated August 25, 1857.

*To all whom it may concern:*

Be it known that I, WM. W. AYRES, of Worcester, in the county of Worcester and State of Massachusetts, have invented a new and useful Improvement in Filters; and I do hereby declare that the following is a full, clear, and exact description of the construction and operation of the same, reference being had to the annexed drawing, forming part of this specification, in which—

Figure 1:
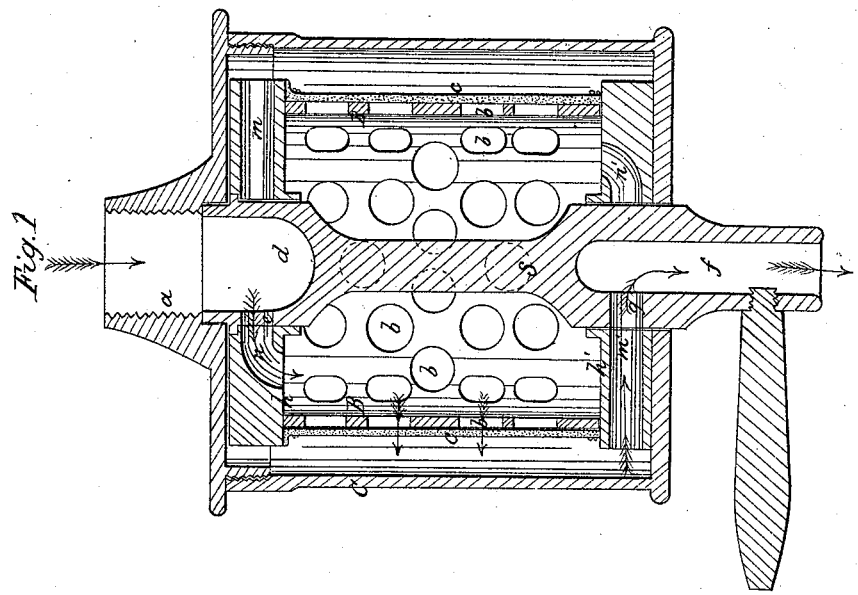
Figure 2:
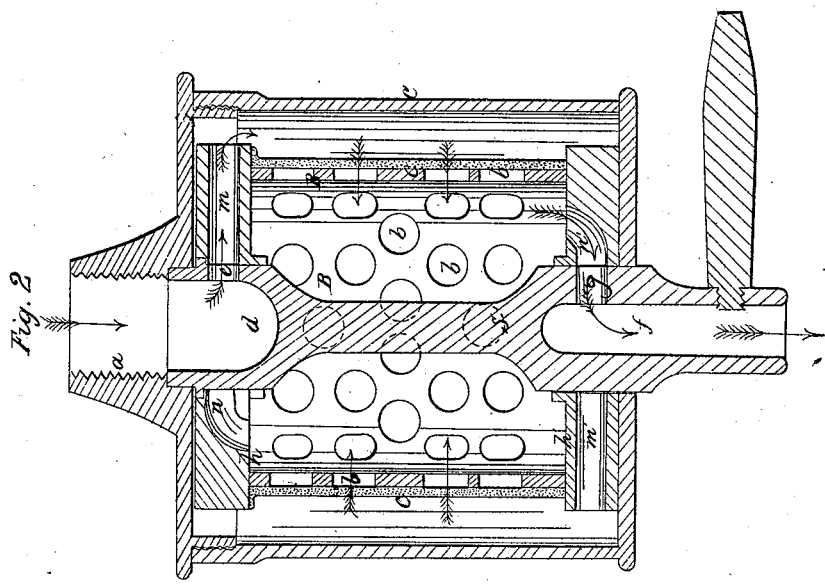

Figure 1 is a section through axis of filter, showing the position for filtering the fluid from the center outward. Fig. 2 is a similar section with parts arranged for filtering from the exterior.

Similar characters of reference denote the same part.

This filter is designed to be attached to the discharge pipe of a hydrant, and is so constructed that by a simple movement of a central spindle, the fluid may be forced through the filtering medium from either side thereof, in order to cleanse the said medium when by continued use it becomes clogged; my invention consisting in the peculiar combination of devices hereinafter to be set forth for accomplishing that object.

In the drawing C is the exterior casing attached to the discharge pipe of the hydrant by screw $a$. B is the inner cylinder with perforations $b$, and covered by the filtering medium $c$. This cylinder is closed at its ends by heads $h\ h'$.

Running longitudinally through the cylinder C, is the central spindle S, all its joints having a close contact. In the head of this spindle is a cavity $d$ with an opening $e$ in the side thereof. The bottom of the spindle has a cavity $f$ and an opening $g$ on the same side as opening $e$.

The heads $h\ h'$, have the channels $m\ n$, $m'\ n'$, communicating on opposite sides with the inner cylinder, and with the space between the cylinders B and C, as shown in the drawing. The mouths of these passages are so placed that they may be made to coincide with the openings $e\ g$ in the spindle, by the turning of the spindle. These passages and openings act as shown in the drawing. In Fig. 1 the fluid passes to the interior of cylinder B and is filtered and discharged as shown by arrows. By turning the spindle 180° the action of the water will be to remove the impurities adhering to the filtering medium and carry them off as shown by arrows in Fig. 2.

I claim—

The combination of cylinders B and C with the spindle S, when constructed with reception and discharge cavities $d\ f$, openings $e\ g$, and channels $m, n, m', n'$, arranged and operating substantially as and for the purposes set forth.

In testimony whereof, I have hereunto signed my name before two subscribing witnesses.

WM. W. AYRES.

Witnesses:
   WM. R. FISHER,
   J. HENRY HILL.